May 26, 1942.   E. P. DU PONT   2,284,381

TEMPERATURE REGULATING MEANS FOR INTERNAL COMBUSTION ENGINES

Filed Nov. 1, 1939

INVENTOR

Eleuthere Paul duPont

BY

ATTORNEYS.

WITNESS:

Patented May 26, 1942

2,284,381

UNITED STATES PATENT OFFICE 2,284,381

TEMPERATURE REGULATING MEANS FOR INTERNAL COMBUSTION ENGINES

Eleuthere Paul du Pont, Montchanin, Del.

Application November 1, 1939, Serial No. 302,328

3 Claims. (Cl. 236—34)

This invention relates to a device for controlling the temperature of the cooling water in internal combustion engines.

The device according to this invention will have general application but will be found of great advantage in connection with engines in marine use.

Internal combustion engines in marine use are ordinarily cooled by sea water drawn from and discharged back into the sea without recirculation through the water jackets and exhaust manifold of the engine. As a consequence such engines are slow in warming up or reaching an efficient operating temperature, and with fairly cold sea water and operation at low speeds will operate at an inefficiently low temperature.

Now in accordance with this invention a device is provided whereby cooling water will be circulated through an engine on starting and until the engine has reached an efficient operating temperature, when ordinary circulation will be automatically permitted.

The device according to this invention, as will appear in detail hereinafter, will comprise essentially a pair of thermostatically actuated valves arranged to control recirculation through an engine or normal discharge to a supply of cooling water drawn from the supply, as the sea, means being provided to insure that both valves will not be closed at the same time.

Having now indicated in a general way the nature and purpose of this invention, I will proceed to a detailed description of a preferred embodiment thereof more particularly in connection with a marine installation, all with reference to the accompanying drawing, in which.

Figure 1:
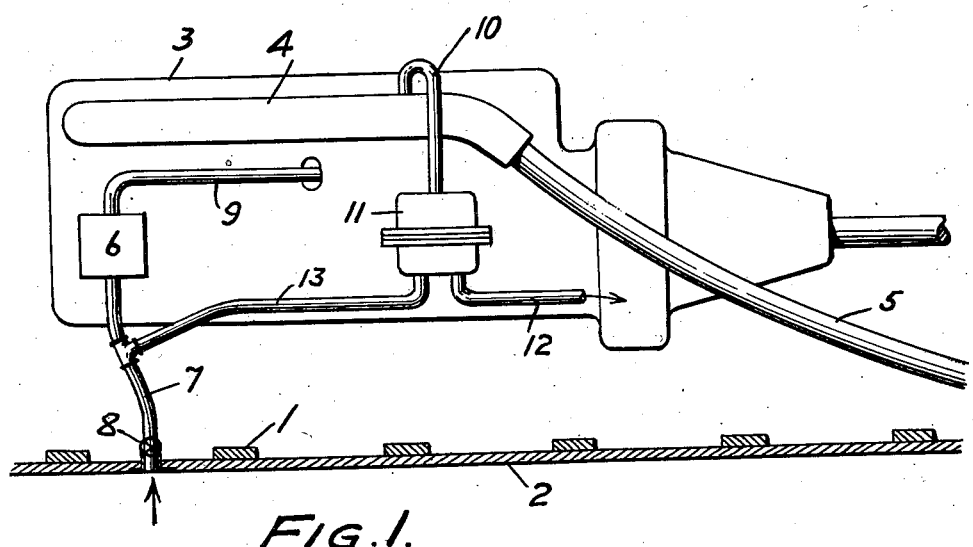
Figure 1 is a side elevation of an internal combustion engine equipped with an embodiment of this invention as installed in a boat indicated in section.

In Figure 1 the bottom of a boat having frames 1 and planking 2 is indicated. Within the boat is mounted, in any usual manner, an engine 3 jacketed for cooling water and provided with a water jacketed exhaust manifold 4 connected to an exhaust conduit 5.

A pump 6, of the constant displacement type, is connected on its suction side through a conduit 7 to a sea cock 8 in the bottom of the boat, and on its discharge side with the water jacket of the engine through a conduit 9. The water jacket of the engine is connected for discharge through the jacket of the exhaust manifold 4 and thence through a conduit 10 into the valve casing 11, from which a conduit 12 leads overboard and from which a conduit 13 leads to the conduit 7.

Figure 2:
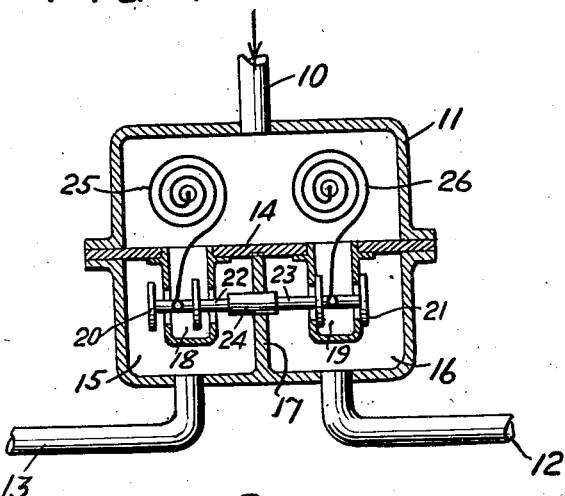
Figure 2 is a sectional view of an embodiment of the device according to this invention.

The valve casing 11, shown in detail in Figure 2, is divided into upper and lower chambers by the horizontal partition 14 and the lower chamber is in turn divided into two chambers 15 and 16 by the vertical partition 17. Communication between the upper chamber and the lower chambers respectively is afforded through the ported passages 18 and 19, the ports in which are controlled by the balanced valves 20 and 21 respectively.

The valves 20 and 21 are provided with stems 22 and 23, the free ends of which are adjacent and bear against the ends of a cylindrical plunger 24 slidably mounted in the partition 17.

The valves 20 and 21 are respectively adapted to be actuated by the thermostats 25 and 26 and the plunger 24 insures that if one of the valves be closed the other will be open.

The conduit 10 carrying water discharged from the jacket of exhaust manifold 4 is connected with the upper chamber of the valve casing 11. The conduit 12 leading overboard or into the exhaust conduit 5 is connected with one of the lower chambers, while the conduit 13 leading to conduit 7 is connected with the other lower chamber.

As will now be obvious, with the pump 6 in operation water delivered through conduit 10 into the valve casing 11 may be returned through conduits 13 and 7 for recirculation through the water jacket of the engine or may be discharged through conduit 12, depending upon the position of valves 20 and 21. In practice with the engine cold the thermostats 25 and 26 will act to open valve 20 and close valve 21. As a consequence when the engine is started water from the jackets will be recirculated and the engine will relatively quickly warm up. When the engine or the cooling water has reached a predetermined temperature the thermostats will operate to close valve 20 and open valve 21, permitting the cooling water to be drawn through sea cock 8 and discharged overboard through conduit 12.

The provision of the two thermostats 25 and 26 and the two independent valves 20 and 21 permits independent regulation of the quantity of cooling water passing to conduits 12 and 13, respectively.

It will be understood that the valves 20 and 21 may be connected together and a single thermostat used for their actuation. Further, it is contemplated that various modification in detail may be made in the device as described above for purposes of illustration without departing from the scope of this invention.

What I claim and desire to protect by Letters Patent is:

1. An automatic fluid temperature regulating device, a casing, partitioning means dividing the casing into a receiving chamber and a pair of discharge chambers, ported passages affording communication between the receiving chamber and the discharge chambers respectively, independent valves controlling said ported passages respectively, independent thermostatic means located in the receiving chamber and connected to said valves respectively for actuating said valves, means adapted to contact with the valves and arranged to cause one of the valves to be fully open when the other is fully closed and conduits communicating with said receiving chamber and with said discharge chambers respectively.

2. An automatic fluid temperature regulating device, a casing, partitioning means dividing the casing into a receiving chamber and a pair of discharge chambers, laterally ported passages affording communication between the receiving chamber and the discharge chambers respectively, independent valves controlling said ported passages respectively, stems extending from said valves toward each other, independent thermostatic means located in the receiving chamber and connected to said valves respectively for actuating said valves, means positioned between and adapted to bear on the ends of said valve stems and adapted to operate when one of said valves is fully closed to cause the other to be fully open and conduits communicating with said receiving chamber and with said discharge chambers respectively.

3. An automatic fluid temperature regulating device, a casing, partitioning means dividing the casing into a receiving chamber and a pair of discharge chambers, ported passages affording communication between the receiving chamber and the discharge chambers respectively, independent valves having opposite extensions arranged in line and movable in opposite directions controlling said ported passages respectively, independent thermostatic means located in the receiving chamber and connected to said valves respectively for actuating said valves, a spacer positioned between said extensions and adapted to contact the ends thereof and adapted in the closing movement of one of said valves to effect an opening movement of the other valve and conduits communicating with said receiving chamber and with said discharge chambers respectively.

ELEUTHERE PAUL du PONT.